July 30, 1963 — G. W. MEEK — 3,099,696
GAS AND LIQUID CONTACT APPARATUS
Filed June 27, 1960

George W. Meek

United States Patent Office 3,099,696
Patented July 30, 1963

3,099,696
GAS AND LIQUID CONTACT APPARATUS
George W. Meek, Pelham, N.Y., assignor to Lizenzia
A.G., Zug, Switzerland, a corporation of Switzerland
Filed June 27, 1960, Ser. No. 38,838
Claims priority, application Sweden July 6, 1959
1 Claim. (Cl. 261—24)

This invention relates to gas and liquid contact apparatus.

More particularly this invention relates to gas and liquid contact apparatus of the general type including a contact body or fill through which a plurality of passage-ways or channels penetrate, and a liquid distributing device, said fill and said body being adapted to perform a movement relative one another.

Liquid discharged from the distributing device is distributed from above into and by gravity flows through the channels of the packing where it is brought into contact with gas such as air raising from below by natural draft or by an induced or forced draft.

Still more particularly this invention relates to gas and liquid contact apparatus provided with a packing formed with a plurality of channels or passage-ways extending throughout said packing and a liquid distributing device, said packing and said liquid distributing device being mounted to perform a movement in relationship to one another which movement normally is effected by rotation of the liquid distributing device.

To be suited for cooling towers the packing is preferably constructed as is disclosed in the Patent No. 2,809,-818, granted October 15, 1957, to Carl Georg Munters, according to the disclosure of which the packing is composed of thin sheets or partition walls of a water-absorbing material, preferably paper. The partition walls may be alternately flat and corrugated and suitably are impregnated with a substance giving to the material required structural strength when in wet condition. To obtain high capacity per unit of volume it has proved to be of particular importance to make the channels narrow. Due to this close spacing the water, however, would tend to bridge the cross area of the channels, and in order to keep the channels open in spite thereof the sheets or partition walls at their lower ends according to the patent are formed with means such as inclined projections or flaps adapted to break the cohesion and in this way to drain the liquid continuously from the channels.

The quantity of water supplied to a unit of receiving face per unit time and that of supplied air are in a definite relationship to one another so that an increase of the liquid quantity is corresponded by an increase of the air quantity. In order to obtain high capacity with a packing of predetermined volume or with predetermined area of the face receiving the liquid the speed of the air through the channels must be accelerated to a maximum value. Such increase results, however, in a tendency of the raising air flow to entrain small drops of the water supplied to the packing and in this way to return them upwardly out of the channels of the packing. Irrespective of the intensity of operation of the cooling tower, drops when entering the channels may initially form bubbles bridging over the cross area of the channels. Such bubbles will burst shortly but then may take the form of fine water particles floating within and flowing with the upwards directed air flow. For other reasons also small water particles may be entrained under some conditions by the raising air flow. All these phenomena together cause waste of water and an undesired wetting of the surroundings of the gas and liquid contact body.

One main object of the invention is to effectively overcome the drawbacks set forth by accomplishing a gas and liquid contact apparatus of the type in consideration provided with means to prevent small water particles from becoming entrained by the gas flow.

A further object of the invention is to accomplish a gas and liquid contact apparatus of the type in consideration which is provided with means to seal the channels or passage-ways of the packing for a period of time sufficient to cause the liquid to be distributed into and be absorbed along the walls of the passage-ways before the raising gas flow has attained its full power.

Further objects and advantages of the invention will become apparent from the following description considered in connection with the accompanying drawing which forms part of this specification and of which:

Figure 1:
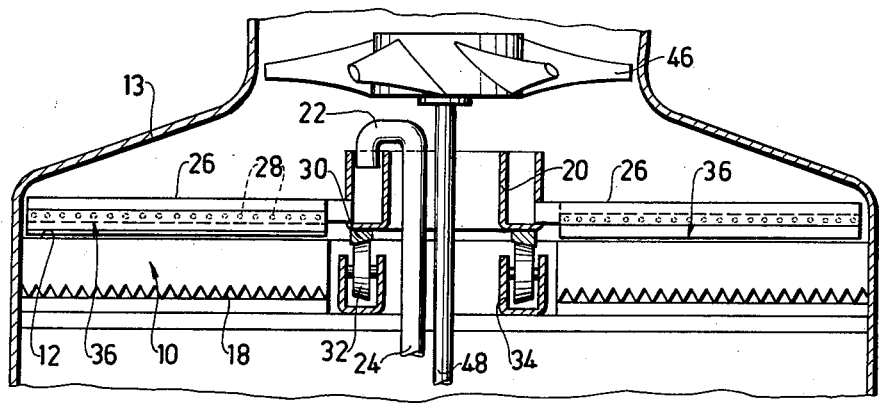
FIG. 1 is a fragmentary vertical sectional view of a cooling tower constructed according to the invention.
Figure 2:
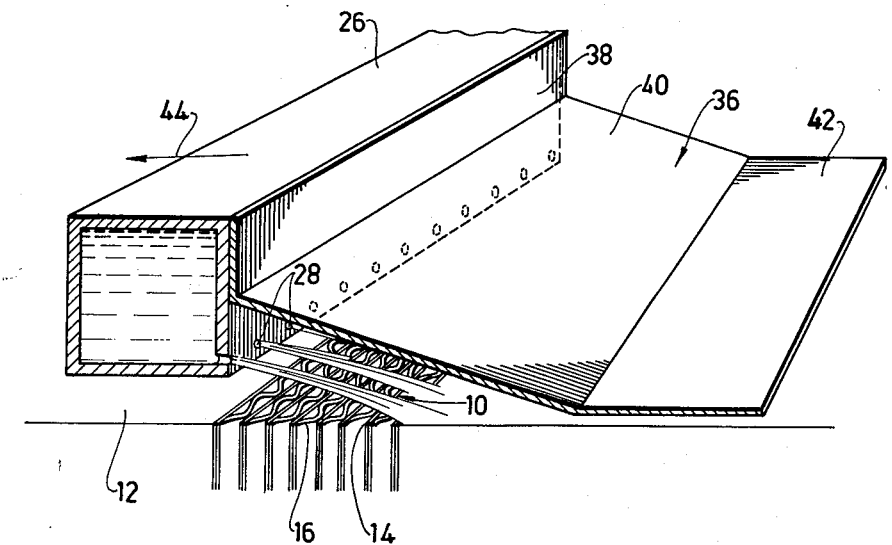
FIG. 2 is a perspective view on a larger scale of a portion of FIG. 1.

Referring to the drawing reference numeral 10 designates generally a packing or contact body having an annular upper face area 12 and occupying the horizontal cross section of a casing 13 of the cooling tower. As is described in detail in the patent specification referred to above, the packing is composed of foils or sheets made of a preferably fibrous organic or inorganic material such as paper of cellulose or asbestos or a combination thereof. The sheets are highly water absorbing while possessing required mechanical strength in wet condition due to impregnation with a phenolic resin, for example. As is shown in FIG. 2 alternately every second sheet 14 in the packing is plane and every second sheet 16 undulated or corrugated. Due to the feature that the spacing between the plane layers 14 is small such as of a magnitude between 3 to 10 millimetres, the packing within a predetermined volume will contain a very large number of narrow channels or passageways extending throughout the same in a vertical direction. The lower edges of the layers are cut off in an inclined manner along cutting surfaces 18 in order to facilitate flowing off of the water and thus prevent the cross sectional area of the channels to be bridged over and clogged at the lower end by drops of water.

Disposed above the packing or contact body is a liquid distribution or spraying device having a central hub portion 20 which forms an upwardly open channel into which the water to be cooled is introduced from the end 22 bent round of a tube 24. From said channel the water is conducted outwards into radially extending sprayer arms 26 which in a suitable number are evenly distributed over the circumference. The arms extend over the packing and have discharge openings 28 which are facing in the same direction so as to cause the spraying device to rotate under the action of the reaction force produced by the water streaming out to fall down on the contact body. This reaction force is determined by the height of the water column within the hub portion 20. The hub portion has at its lower face an annular rail 30 which rests on suitably conical wheels 32 carried by pedestals 34. With large dimensions of the cooling tower the sprayer arms become very long as is described more in detail in patent application No. 36,840, filed June 17, 1960.

According to the present invention, there are disposed on the individual sprayer arms 26 screens which are generally designated by 36 and which by means of a flange portion 38 are rigidly secured to the arm 26 above the discharge openings 28 thereof. From said flange portion another portion 40 projects in an inclined manner outwards and downwards to immediate vicinity of the upper face 12 of the packing. Moreover the screen 36 may have a portion 42 constituting a continuation of the portion 40 but being substantially in parallel with the upper face 12. The screen 36 follows the sprayer arm 26 over substantially the entire extension of this latter as far as it is located over the packing and provided with the discharge holes 28. The screen may have a breadth increasing in a ray-like manner radially outwards.

The jets of water discharged from the openings 28 of the arms 26 cause the sprayer to rotate in the direction indicated in FIG. 2 by the arrow 44. The rotational speed of the sprayer is dependent on the number of arms and may be adjusted so as to cause the individual zones of the packing to be wetted about 3 times per minute. With four arms, for example, the number of revolutions of the spraying device will be about 7.5 per minute. The water jets fall downwards towards the packing and continue inwards within the many channels or passage-ways thereof. The screen 36 ensures that the water drops have time to be soaked up by the layers 14 and 16 or deposit themselves as a film along the channel walls before the channels are given free by the screen. The screen 36 acts also as a damper on the speed of the air flowing through the channels as long as they are covered by the same. The screen may constitute a kind of trap which catches the water particles raising with the feeble air flow. The air is sucked through the channels of the body 10 by means of a fan 46 supported by a shaft 48.

The apparatus may be adapted to other liquids and other gases than water and air in such cases where similar conditions are prevailing. The packing may rotate whereas the liquid distributing device is rotationally stationary. The spraying device may perform another movement than a rotational one relatively to the packing. The screen may also constitute a portion of the spraying device proper. It is possible to locate the screen on the lower-side of the packing which means adjacent the face opposite that adjacent the liquid distributing device, in which case the screen must be located opposite to and thus block the channels of that portion of the packing which just has been wetted.

By disposing the sprayer arms immediately adjacent the front face 12 of the packing said arms also assist in throttling the air flow through the portion of the packing below the screen and thus act as sealing elements. The discharge openings of the sprayer arms are directed so that the water drops have a minimum of peripheral speed when they impact the contact body. The minor the length of the curve of projection of the drops the minor becomes the area which the screen has to block.

While one more or less specific embodiment of the invention has been shown and described it is to be understood that this is for purpose of illustration only, and that the invention is not to be limited thereby, but its scope is to be determined by the appended claim.

What I claim is:

In a spraying device for gas and liquid contact apparatus, a packing composed of a series of spaced water-absorbing wettable members having a series of vertical passages for the gas and liquid, means for causing a flow of gas through the vertical passages, a rotatable spraying device provided with a plurality of hollow radial arms operative above the packing for moistening the same, each of the arms being provided with a row of substantially horizontally directed discharge openings operative to project jets of liquid over the upper surface of the packing in a manner to contact the packing in the form of relatively large drops or particles and cause rotation of said arms, each of the arms being provided at one side with a laterally-projecting trailing screen in the form of an imperforate plate, said screen being interposed between the means for causing the gas flow through the packing and being attached at one end to the arm at a point above the row of discharge openings therein and extending angularly downward from said point of attachment and terminating at a point below the bottom of the arm and slightly above the surface of the packing, the screen being provided at its free end with a horizontal extension disposed substantially parallel to the upper surface of the packing and spaced slightly above said surface, said screen being effective to cover the spaced wettable members while the same are being sprayed with liquid, said horizontal extension on each screen being in the form of a flat panel located below the lower surface of said arms on which the screen is carried, each screen and arm forming a downwardly opening, angular groove into which said jets of liquid are discharged, said lower surface of said arms being imperforate and combining with said screen to mask the passages ahead of and behind said jets, said spraying device including an annular hub having an upwardly opening liquid chamber extending vertically above said arms, said arms including inner ends communicating with said liquid chamber, and means for directing a source of liquid axially through said hub and downwardly into said liquid chamber for discharging liquid into said chamber, propelling said spraying device and providing the liquid to be sprayed onto the wettable members.

References Cited in the file of this patent

UNITED STATES PATENTS

| 1,462,861 | Jordan | July 24, 1923 |
| --- | --- | --- |
| 2,518,771 | Gol | Aug. 15, 1950 |
| 2,589,020 | North | Mar. 11, 1952 |
| 2,595,702 | Prevost | May 6, 1952 |
| 2,809,818 | Munters | Oct. 15, 1957 |
| 2,906,512 | Meek | Sept. 29, 1959 |

FOREIGN PATENTS

| 112,653 | Great Britain | Jan. 16, 1918 |
| --- | --- | --- |
| 116,839 | Great Britain | June 27, 1918 |